(12) United States Patent
Davis (10) Patent No.: US 7,330,958 B2
(45) Date of Patent: Feb. 12, 2008

(54) METHOD AND APPARATUS FOR TRANSLATING A VIRTUAL ADDRESS TO A REAL ADDRESS USING BLOCKS OF CONTIGUOUS PAGE TABLE ENTRIES

(75) Inventor: Gordon Taylor Davis, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 11/232,773

(22) Filed: Sep. 22, 2005

(65) Prior Publication Data

US 2007/0079106 A1 Apr. 5, 2007

(51) Int. Cl.
  *G06F 12/00* (2006.01)
(52) U.S. Cl. .................. 711/203; 711/207; 711/216
(58) Field of Classification Search .................... None
  See application file for complete search history.

(56) References Cited

U.S. PATENT DOCUMENTS

2006/0069899 A1* 3/2006 Schoinas et al. ............ 711/206

* cited by examiner

*Primary Examiner*—Reginald Bragdon
*Assistant Examiner*—Horace L. Flournoy
(74) *Attorney, Agent, or Firm*—Roy W. Truelson (57) ABSTRACT

A page table mechanism translates virtual addresses to real addresses. In a first aspect, page table entries are contained in equal-sized blocks, the entries within each block corresponding to contiguous pages of virtual address space. Preferably, the common high-order portion of the virtual address is contained in segments distributed among multiple page table entries of the block. In a second aspect, the virtual address indexes a binary tree definitional structure. Decode logic traverses a binary tree defined by the definitional structure by testing selective bits of the virtual address to reach a leaf of the binary tree, which defines the location of data defining the real address.

17 Claims, 6 Drawing Sheets

| Real Page Number - Entry 00 | WIMG | V/N/PP | VPN |
|---|---|---|---|
| Real Page Number - Entry 01 | WIMG | V/N/PP | VPN |
| Real Page Number - Entry 02 | WIMG | V/N/PP | VPN |
| Real Page Number - Entry 03 | WIMG | V/N/PP | VPN |
| Real Page Number - Entry 04 | WIMG | V/N/PP | VPN |
| Real Page Number - Entry 05 | WIMG | V/N/PP | VPN |
| Real Page Number - Entry 06 | WIMG | V/N/PP | VPN |
| Real Page Number - Entry 07 | WIMG | V/N/PP | VPN |
| Real Page Number - Entry 08 | WIMG | V/N/PP | VPN |
| Real Page Number - Entry 09 | WIMG | V/N/PP | VPN |
| Real Page Number - Entry 10 | WIMG | V/N/PP | VPN |
| Real Page Number - Entry 11 | WIMG | V/N/PP | VPN |
| Real Page Number - Entry 12 | WIMG | V/N/PP | VPN |
| Real Page Number - Entry 13 | WIMG | V/N/PP | Com |
| Real Page Number - Entry 14 | WIMG | V/N/PP | Com |
| Real Page Number - Entry 15 | WIMG | V/N/PP | Com 0 |

FIG. 4

| A0 | B0 | B1 | C0 | C1 | C2 | C3 | |
|----|----|----|----|----|----|----|---|
| D0 | E0 | E1 | F0 | F1 | F2 | F3 | Base Addr ( 0 - 7 ) |
| D1 | E2 | E3 | F4 | F5 | F6 | F7 | Base Addr ( 8 - 15 ) |
| D2 | E4 | E5 | F8 | F9 | F10 | F11 | Base Addr ( 16 - 23 ) |
| D3 | E6 | E7 | F12 | F13 | F14 | F15 | Base Addr ( 24 - 31 ) |
| D4 | E8 | E9 | F16 | F17 | F18 | F19 | Base Addr ( 32 - 39 ) |
| D5 | E10 | E11 | F20 | F21 | F22 | F23 | Base Addr ( 40 - 47 ) |
| D6 | E12 | E13 | F24 | F25 | F26 | F27 | Base Addr ( 48 - 55 ) |
| D7 | E14 | E15 | F28 | F29 | F30 | F31 | Base Addr ( 56 - 63 ) |

METHOD AND APPARATUS FOR TRANSLATING A VIRTUAL ADDRESS TO A REAL ADDRESS USING BLOCKS OF CONTIGUOUS PAGE TABLE ENTRIES

FIELD OF THE INVENTION

The present invention relates to digital data processing hardware, and in particular to the design and operation of address translation mechanisms for accessing real memory in a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPUs) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the "throughput") may be crudely measured as the number of operations performed per unit of time. Conceptually, the simplest of all possible improvements to system speed is to increase the clock speeds of all of the various components simultaneously. E.g., if everything runs twice as fast but otherwise works in exactly the same manner, the system will perform a given task in half the time. Early computer systems contained processors which were constructed from many discrete components. These systems were susceptible to significant clock speed improvements by shrinking and combining components, eventually packaging the entire processor as an integrated circuit on a single chip.

Simply improving the speed of a single component will not necessarily result in a corresponding increase in system throughput. The faster component may find itself idle while waiting for some slower component most of the time.

A computer's CPU operates on data stored in the computer's addressable main memory. The memory stores both the instructions which execute in the processor and the data which is manipulated by those instructions. In operation, the processor is constantly accessing instructions and other data in memory, without which it is unable to perform useful work. In recent years, improvements to processor speed have generally outpaced improvements to the speed of accessing data in memory. The time required to access this data is therefore a significant factor affecting system throughput.

Nearly all modern computer systems use some form of virtual addressing, in which an address in a relatively large address space associated with one or more software processes is translated to an address in a relatively smaller address space associated with memory. The former are referred to herein as "virtual addresses", although they are known in some architectures as "effective addresses" or by other names. The latter are referred to herein as "real addresses", although they may also be known as "physical addresses", "memory addresses" or by some other name. In some architectures, multiple levels of addresses of the former type may exist and/or multiple levels of the latter type may exist. However, the fundamental distinction between the former and the latter is that virtual addresses, however named, have no permanent or persistent correspondence to actual locations in the computer system's memory, while real addresses do. I.e., each real address corresponds to a respective location in the physical hardware memory of the computer system, and maintains this correspondence in a persistent manner as different software processes are initiated and terminated (although in some architectures, it may be possible to change the correspondence by re-configuring the system, adding or removing memory, or similar events). The correspondence between a virtual address and physical memory is ephemeral, and can change as new pages are brought into physical memory from storage and other pages are removed from memory. At any instant in time, most virtual addresses typically have no corresponding assignment in physical memory, i.e, the data at that address is either unallocated or held in storage, but not in main memory.

Modern systems use virtual addressing for the simple reason that modern software processes typically require larger address spaces than are practical to implement in physical memory. When an executing process requires access to a range of virtual addresses, that range is temporarily assigned a corresponding range of real addresses (i.e., locations in physical memory). The assignment is necessarily temporary because there are not enough real addresses to go around. The real addresses will eventually be assigned to some other range of virtual addresses.

Computer systems typically use a mechanism called a page table to record the temporary assignments of virtual addresses to real addresses, a "page" being the smallest unit of address assignment. Although referred to as a "page table", this mechanism may have a more complex structure. When the processor generates a virtual address to which an executing process requires access, an address translation mechanism references the page table to determine the correct real address corresponding to a given virtual address, i.e., to translate a virtual address to a real address.

Translation of a virtual address to a real address is a critical component of memory access. In many systems, translation look-aside buffers (which are effectively caches of address translation data derived from the page table) or similar mechanisms are used to assist translation, but for at least some translations it is necessary to access the page table itself. The operational characteristics of the page table and its associated address translation mechanisms are significant contributors to overall system performance.

Conventionally, page table mechanisms have typically followed one of two design approaches. In a first approach, referred to herein as a direct mapped table, the page table contains one entry for each page of addresses in the virtual address space, this entry containing a high-order portion of the corresponding real address (the low-order portion being copied from the corresponding low-order bits of the virtual address). In a second approach, referred to herein as a hashed table, the page table contains substantially fewer then one entry for each page of address in the virtual address space, the entries being accessed by some less direct mechanism, such as hashing some part of the virtual address. In the second approach, each entry in the page table not only contains the high-order portion of the real address, but some portion of the virtual address as well. This portion of the virtual address must be compared with the original virtual address to verify that the entry from the hashed table in fact corresponds to the desired virtual address (and not some other virtual address).

The direct mapped page table is conceptually simpler, but requires a large amount of memory to hold the entire page table. Where the virtual address space is far larger than the real address space and is very sparsely allocated, as is commonly the case in modern systems, a lot of space may be consumed by null page table entries. This problem tends to become more acute as software processes use larger and larger virtual address spaces. Inefficient use of memory space can affect performance, because it becomes difficult to store sufficient portions of the page table in cache, or even in main memory, which increases the access time to the page table itself.

The hashed table uses memory more efficiently, but the complexity of the translation mechanism often means that translations are slow, and the need to store a virtual address increases the size of each entry. For example, consecutive entries in a hashed table typically do not correspond to consecutive pages in the virtual address space. In many processes, there is a need to access consecutive pages or otherwise a locality of memory reference. Conventional hashed page tables typically require independent translations for such consecutive pages. At the same time, it is desirable to store the page table in cache, and the size of entries in the virtual page limits the number of entries in each cache line A need exists for improved techniques for translating a virtual address to a real address in a computer system. In particular, a need exists for an improved page table access and translation mechanism, which avoids the excessive memory consumption of the direct mapped approach while obtaining at least some of its advantages.

SUMMARY OF THE INVENTION

In a first aspect of the preferred embodiment of the present invention, a hashed page table mechanism for translating virtual addresses to real addresses contains a plurality of equal-sized blocks of page table entries, each block containing a set of entries corresponding to contiguous pages of a virtual address space. Since all entries in a block share a common high-order portion of the virtual address, this virtual address portion is only needed once for the entire block. Preferably, pieces of this common high-order virtual address portion are distributed across individual page table entries. Each page table entry therefore contains only a small portion of the virtual address, effectively reducing the required size of the page table entry.

In a second aspect of the preferred embodiment of the present invention, a function of the virtual address is used to determine an index address for accessing a hashed page table. The page table includes a plurality of binary tree definitional structures which are accessed using the index address. The virtual address determines a binary tree definitional structure to be accessed, and decode logic traverses a binary tree defined by the definitional structure by testing selective bits of the virtual address to reach a leaf of the binary tree. The leaf defines the location of data defining a real address to which the virtual address maps, e.g., the page table entries.

In the preferred embodiment, which incorporates both of the above aspects, a hash function of the virtual address is used to determine an index address for accessing a page line of a base page table, where multiple virtual addresses may map to the same page line. The page line contains either a single block (called an "extended page table entry group" or "EPTEG") of page table entries, or a binary patricia tree control block for referencing a set of multiple blocks (EPTEGs) of page table entries. If the page line contains a patricia tree control block, the binary tree is traversed by testing selective bits of the virtual address to reach a leaf. The leaf defines the location of a single block of page table entries. Therefore, when multiple different active virtual addresses hash to the same index address, it is possible to provide separate blocks of page table entries for each. Once a block is determined, the location of a page table entry within the block is determined by a direct decoding of virtual address bits immediately above the untranslated low-order bits corresponding to the page size. However, various alternative embodiments of the present invention are possible, and in particular, it would be possible to implement the first aspect described above without implementing the second aspect, or vice-versa.

By organizing the page table in blocks of page table entries corresponding to contiguous virtual addresses, multiple page table entries can share the same virtual address, increasing the number of page table entries in a given memory space, and in particular increasing the number of page table entries in a given cache line. Furthermore, because many processes exhibit locality of memory reference, the probability that a future memory reference will require a page table entry in an existing cache line, loaded during access of a previous page table entry, is significantly increased. Furthermore, the use of a binary tree definitional structure to define the locations of page table entries supports a potentially large number of page table entries (expansion entries) for each indexed value, yet permits entries to be allocated in memory as required without using up memory for all of the page table entries potentially available. Finally, a base page table containing binary tree structures for expansion entries can be searched with a maximum of two memory references. Collectively, these factors provide a page table mechanism which is both economical in its use of real memory and efficient in operation.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
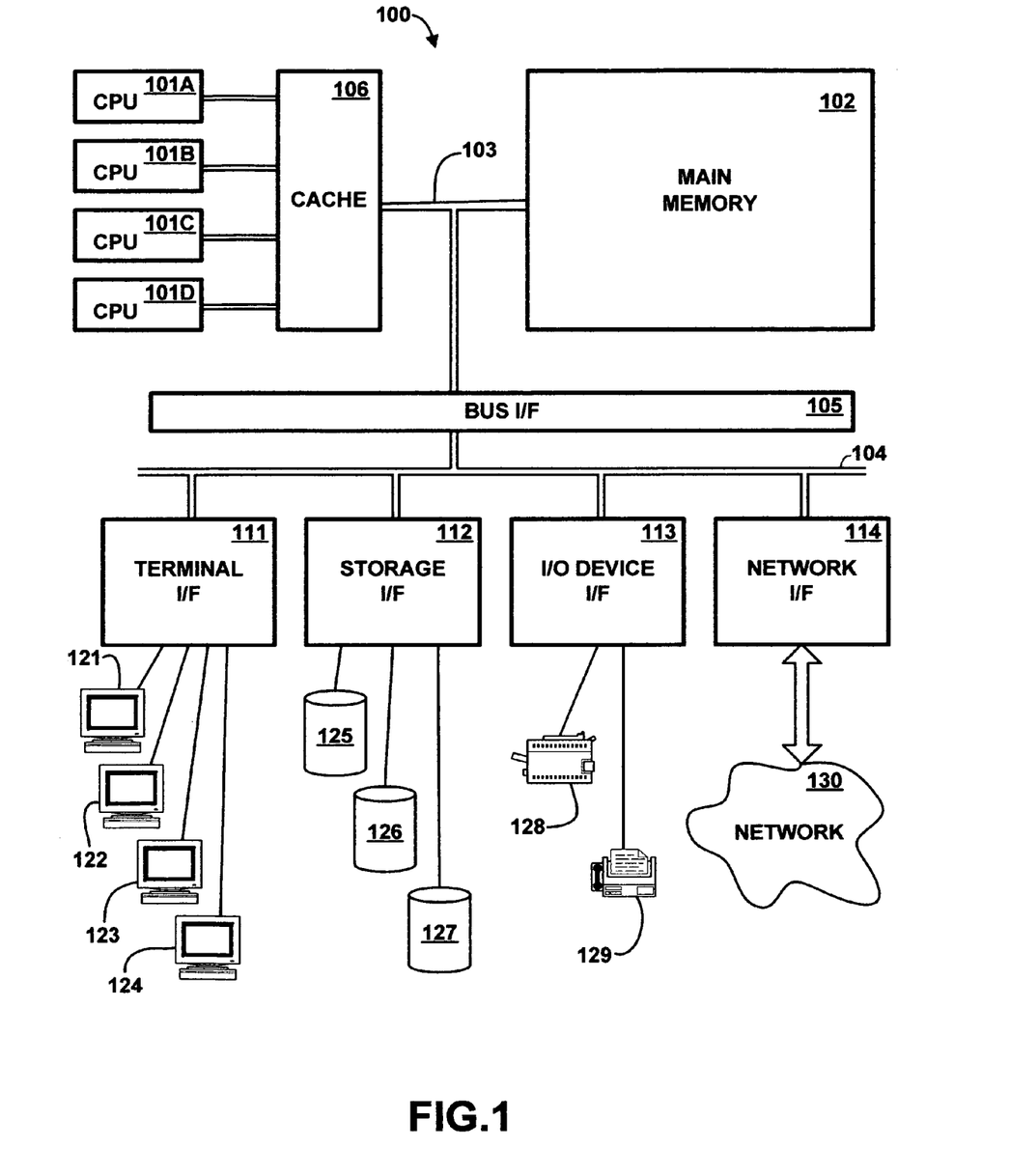
FIG. 1 is a high-level block diagram of the major hardware components of a computer system for utilizing a memory page table having blocks of contiguous page table entries, according to the preferred embodiment of the present invention.

Referring to the Drawing, wherein like numbers denote like parts throughout the several views, FIG. 1 is a high-level representation of the major hardware components of a computer system 100 for utilizing a memory page table having blocks of page table entries corresponding to contiguous virtual addresses, according to the preferred embodiment of the present invention. The major components of computer system 100 include one or more central processing units (CPU) 101A-101D, main memory 102, cache memory 106, terminal interface 111, storage interface 112, I/O device interface 113, and communications/network interfaces 114, all of which are coupled for inter-component communication via buses 103, 104 and bus interface 105.

System 100 contains one or more general-purpose programmable central processing units (CPUs) 101A-101D, herein generically referred to as feature 101. In the preferred embodiment, system 100 contains multiple processors typical of a relatively large system; however, system 100 could alternatively be a single CPU system. Each processor 101 executes instruction stored in memory 102. Instructions and other data are loaded into cache memory 106 from main memory 102 for processing. Main memory 102 is a random-access semiconductor memory for storing data, including programs. Although main memory 102 and cache 106 are represented conceptually in FIG. 1 as single entities, it will be understood that in fact these are more complex, and in particular, that cache exists at multiple different levels, as described in greater detail herein. Likewise, while some levels of cache may be shared among multiple CPUs as depicted in FIG. 1, other levels of cache may comprise multiple cache arrays, each closely coupled to a single CPU.

Buses 103-105 provide communication paths among the various system components. Memory bus 103 provides a data communication path for transferring data among CPUs 101 and caches 106, main memory 102 and I/O bus interface unit 105. I/O bus interface 105 is further coupled to system I/O bus 104 for transferring data to and from various I/O units. I/O bus interface 105 communicates with multiple I/O interface units 111-114, which are also known as I/O processors (IOPs) or I/O adapters (IOAs), through system I/O bus 104. System I/O bus may be, e.g., an industry standard PCI bus, or any other appropriate bus technology.

I/O interface units 111-114 support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O and other device interface 113 provides an interface to any of various other input/output devices or devices of other types. Two such devices, printer 128 and fax machine 129, are shown in the exemplary embodiment of FIG. 1, it being understood that many other such devices may exist, which may be of differing types. Network interface 114 provides one or more communications paths from system 100 to other digital devices and computer systems; such paths may include, e.g., one or more networks 130 such as the Internet, local area networks, or other networks, or may include remote device communication lines, wireless connections, and so forth.

It should be understood that FIG. 1 is intended to depict the representative major components of system 100 at a high level, that individual components may have greater complexity that represented in FIG. 1, that components other than or in addition to those shown in FIG. 1 may be present, and that the number, type and configuration of such components may vary. It will further be understood that not all components shown in FIG. 1 may be present in a particular computer system. Several particular examples of such additional complexity or additional variations are disclosed herein, it being understood that these are by way of example only and are not necessarily the only such variations.

Although main memory 102 is shown in FIG. 1 as a single monolithic entity, memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among cache 106, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. Computer system 100 may alternatively be a single-user system, typically containing only a single user display and keyboard input, or might be a server or similar device which has little or no direct user interface, but receives requests from other computer systems (clients).

While various system components have been described and shown at a high level, it should be understood that a typical computer system contains many other components not shown, which are not essential to an understanding of the present invention.

Figure 2:
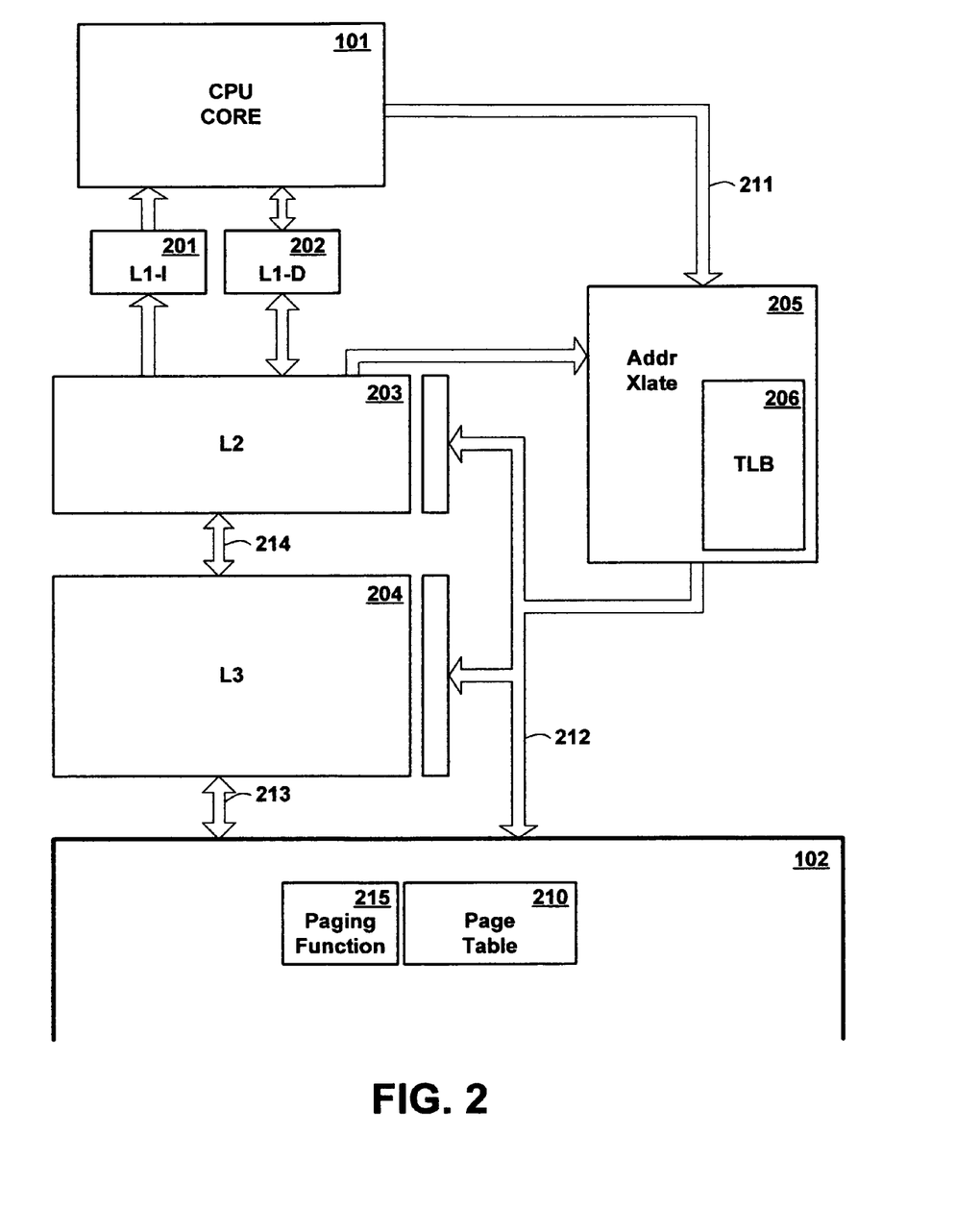
FIG. 2 represents in greater detail the hierarchy of various caches and address translation mechanisms, according to the preferred embodiment.

FIG. 2 represents in greater detail the hierarchy of various caches and address translation mechanisms for translating virtual addresses generated by a processor to real addresses for accessing memory, according to the preferred embodiment. In this embodiment, there is a hierarchy of caches at levels designated level 1 (the highest level), level 2, level 3, in addition to main memory. In general, caches become faster, and store progressively less data, at the higher levels (closer to the processor). Each processor 101 is associated with a respective pair of level 1 caches, which is not shared with any other processor. One cache of this pair is a level 1 instruction cache (L1 I-cache) 201 for storing instructions for execution on processor 101. The other cache of the pair is a level 1 data cache (L1 D-cache) 202 for storing data (other than instructions) to be processed by processes executing on processor 101. Each processor is further associated with a respective level 2 cache 203 and a level 3 cache 204, which can generally store any form of data from memory 102. Each pair of Level 1 caches 201, 202 is preferably dedicated to a single corresponding processor; each L2 cache 203 and each L3 cache 204 is typically shared among multiple processors, although one or more of such caches could alternatively be dedicated to single respective processors. For clarity of illustration, FIG. 2 shows only one processor 101, one pair of L1 caches 210, 202, one L2 cache 203 and one L3 cache 204, but the number of processors and caches at various levels of system 100 could vary, and the number of processors sharing a cache at each of the various levels could also vary. It should further be understood that the number of cache levels could vary, and there could be more or fewer than three levels of cache.

The smallest unit of data which can be brought into a cache is called a cache line. In the preferred embodiment, all caches have a cache line size of 128 bytes, but in alternative embodiments this number could vary.

Resident in main memory 102 is a page table 210 and paging function 215. Page table 210 is a set of data structures which contain data recording the temporary association of virtual addresses to real addresses, i.e. the assignment of pages of physical memory to corresponding virtual address ranges. Paging function is a low-level operating system function which assigns real memory addresses to pages brought in from storage, selects pages to be paged out, and maintains the page table 210.

Each processor is further associated with an address translation mechanism 205 for translating virtual addresses generated by the processor to real addresses for accessing memory, using data from page table 210. Address translation mechanism 205 comprises translation logic for translating a virtual address to a real address using data in a page table entry, and at least one translation look-aside buffer 206, which is essentially a high-level cache of page table data. Although page table 210 is referred to as a "table" and represented in simplified form in FIG. 2, it is in reality a set of more complex data structures, not necessarily located at contiguous addresses. The structure of page table 210 and operation of the address translation mechanism thereon is described in greater detail herein.

The entries in page table 210, being just data, can be brought into the L3 or L2 caches (but are not brought into L1 I-cache 201 or L1 D-cache 202, since those are used for particular respective types of data). Because the page table is frequently referenced, there is typically at least a portion of the table in L2 or L3 cache. TLB 206 is effectively a high-level cache for page table data.

CPU 101 generates virtual addresses for translation on virtual address path 211 to address translation mechanism 205. Upon receiving a virtual address to be translated, address translation mechanism 205 looks first for the required address in TLB 206. If the address is not present in the TLB, address translation mechanism will generate it from page data in page table 210, loading the data from L2 or L3 cache, if possible, and failing that, from page table 210 in main memory. The generated address is stored in an entry in the TLB. The address translation mechanism 205 outputs the resultant real address to decode logic associated with cache and/or memory on real address path 212.

As described herein, address translation mechanism 205 utilizes a single TLB 206, and accesses page table data from L2 or L3 cache. However, many alternative architectures are possible for caching data derived from page table 210. There might be multiple TLBs or other structures for caching data derived from page table 210, occupying different hierarchical levels. Additional structures might be present for various forms of address translation, particularly where multiple levels of virtual and/or real addresses exist. Alternatively, there might be no TLB at all. Page table data might be placed in dedicated caches rather than in general-purpose L2 or L3.

In the preferred embodiment, L2 cache 203 and L3 cache 204 are addressed using real addresses, while L1 caches 201, 202 are addressed using virtual addresses. The use of real addresses to access cache necessarily means that addresses for data access must be translated by address translation mechanism 205 before accessing cache, but has significant advantages in other respects, particularly in maintaining cache coherency where a system has multiple processors and caches. Accessing caches using real vs. virtual addresses is an architectural design choice involving many factors, and some system architectures use exclusively real addresses to access all caches, some use exclusively virtual addresses, and some use virtual addresses for certain caches (higher-level caches) and real addresses for others. Although a particular embodiment is described herein, the present invention is not limited to any particular architecture, and could be employed in systems using any of these variations.

As represented FIG. 2, data paths exists between main memory and L3 cache 204, between L3 cache 204 and L2 cache 203, and between L2 cache 203 and L1 caches 201, 202 and TLB 207. Although these are represented as running through sequential levels of cache, as is well known in computer system architecture, it may be possible in some designs to by-pass some cache levels or to simultaneously load data from memory to multiple cache levels and/or TLB. Although FIG. 2 represents data paths conceptually as direct paths, they may in fact be implemented as multiple successive buses or similar data paths.

FIG. 2 is intended to depict certain functional relationships among the various caches, and the fact that certain components are shown separately is not intended as a representation of how the components are packaged. Modern integrated circuit technology has advanced to the point where at least some cache is typically packaged on the same integrated circuit chip as a processor (sometimes also referred to as a processor core, to distinguish it from caches and other mechanisms). Typically, the L1 caches 201, 202 and address translation mechanism 205 are packaged on the same integrated circuit chip as the processor, and may be considered part of the processor. It is even possible to place multiple processor cores on a single chip, with a certain amount of shared cache. For example, a pair of CPUs 101

(not shown), together with a pair of respective L1 I-caches 201, a pair of respective L1 D-caches 202, and a pair of respective address translation mechanisms 205 might be packaged on a single integrated circuit chip along with a single L2 cache which is shared by both processors. The L3 cache 205 or other caches may be packaged as separate integrated circuit chips mounted on a common printed circuit card with the corresponding processor chip. However, this arrangement is only one possible packaging arrangement, and as integrated circuit and other electronics packaging technology evolves it is conceivable that further integration will be employed.

Figure 3:
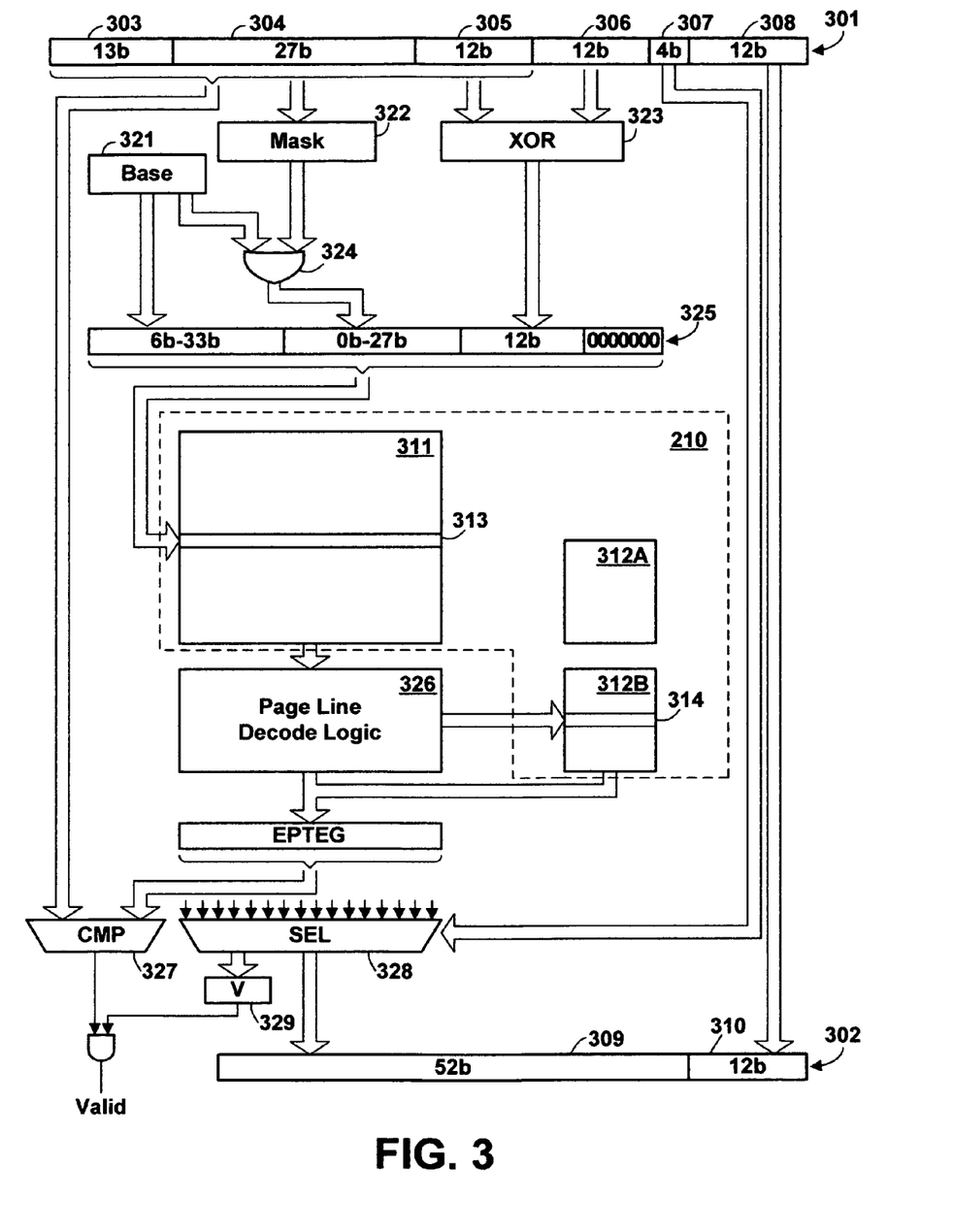
FIG. 3 represents in greater detail the structure of a page table and address translation hardware which translates a virtual address to a real address using information in the page table.

FIG. 3 represents in greater detail the structure of page table 210 and address translation hardware 205 which translates a virtual address to a real address using information in the page table. Referring to FIG. 3, various components of virtual address translation hardware use data in the page table to translate an 80-bit virtual address 301 to a 64-bit real address 302. By convention, virtual address bits are numbered 0 to 79, 79 being the highest, and real address bits are numbered 0 to 63. For purposes of page translation, virtual address 301 is divided into six sections, consisting of: 13-bit high segment 303 (bits 79:67), 27-bit middle segment 304 (bits 66:40); 12-bit low segment 305 (bits 39:28); 12-bit high page 306 (bits 27:16); 4-bit low page 307 (bits 15:12; and 12-bit byte 308 (bits 11:0). Real address 302 consists of two sections, being 52-bit real page 309 (bits 63:12) and 12-bit byte 310 (bits 11-0). The 64-bit real address represents the maximum real address which the translation mechanism will support in the preferred embodiment, and many systems may use fewer than 64 of the potentially available real address bits. In the preferred embodiment, the minimum page size in real memory is 4096 bytes. The 12-bit byte portion 310 of a real address represents that part of an address within a real memory page, and this portion is derived directly from the corresponding 12-bit byte portion 308 of the virtual address, without translation. For larger page sizes, the byte portion 308 includes additional bits in order to fully address all bytes within the page, and the high page portion 306 includes correspondingly fewer bits. The 52-bit real page 309 is derived as described herein.

In operation, when address translation mechanism 205 receives a virtual address for translation from the processor, it will attempt to directly translate the high-order 68 bits of virtual address to a corresponding 52-bit real page by first accessing TLB 206. TLB 206 is preferably an N-way associative cache which is indexed using some function of the virtual address. Each TLB entry contains a portion of a virtual address and the real page to which it translates. Therefore the TLB hardware obtains the N TLB entries which are indexed by the function of the virtual address, and compares each virtual address portion in each entry with the corresponding portion of the virtual address to be translated. If any entry matches the virtual address to be translated, its real page is the correct real page corresponding to the virtual address. If there are no matches, there is a TLB miss, and the address translation mechanism must construct a real address from page table data. In this case, the translated real address is typically stored as an entry in the TLB for future reference, and an existing entry in the TLB is evicted, using any of various conventional algorithms to select an entry for eviction. The mechanisms shown in FIG. 3 for translating a virtual address to a real address are used only if there is a TLB miss.

Page table 210 comprises one and only one base page table 311 and a variable number of page table extension blocks 312A, 312B (herein generically referred to as feature 312), of which two are shown in FIG. 3, all of which are resident in memory 102. Base page table 311 contains a plurality of page lines 313 of fixed size, at contiguous memory locations. Each page line contains either an extended page table entry group (EPTEG), or a patricia tree control block. Page table extension block 312 contains a plurality of extension block lines 314 of fixed size at contiguous memory locations, each line containing an EPTEG. In the preferred embodiment, both the page lines 313 and the extension block lines 314 are 128 bytes, corresponding to the size of a cache line. Although the page lines within the base page table and the extension block lines within the extension block are contiguous, the base page table is not necessarily contiguous with an extension block, nor are extension blocks necessarily contiguous with one another.

Address translation hardware includes base page table address register 321, middle segment mask 322, hash XOR 323, and bit-wise OR 324, which are collectively used to produce an indexing address 325 for selecting a page line 313 from base page table 311. The indexing address 325 is the real address in memory of a page line 313 to be accessed. The low 7 bits of indexing address 325 are always zero (corresponding to the 128-byte page line size). Hash XOR 306 produces a 12-bit exclusive-OR of 12-bit low segment 305 and 12-bit high page 306 of the virtual address, the 12-bit result being immediately above the 7 low order zero bits. Middle segment mask 322 masks selective bits of middle segment section 304 of the virtual address for use as additional bits in indexing base page table 311. The number of bits masked by mask 322 is programmably configurable. Middle segment mask 322 therefore allows the same address translation hardware to support different sizes of base page table 311. The smallest size supported corresponds to masking all 27 bits of middle segment 304, so that only the 12-bit index portion derived from XOR 323 is available to index the base page table. In this case, the base page table holds 4096 page lines of 128 bytes each, a total size of 512 KB. If none of the middle segment bits is masked, a base table could theoretically contain as many as $2^{39}$ page lines, although current systems are unlikely to need anything that large, and there may be other limitations on the page table size. Base page table address register 321 contains the high-order bits of the real address of the beginning of the base page table. These are concatenated with the bits of middle segment section 304 which are not masked by mask 322 to produce a 33-bit real address portion of the index. In the preferred embodiment, base page table address register 321 contains 33 bits, the high-order 6 bits of index address 325 being derived directly from register 321, and the remaining 27 bits being derived from OR logic 324 as a bit-wise OR of the low-order 27 bits of base page table address register 321 and the 27-bit output of mask 322. Any bit positions of middle segment 304 which are not masked by mask 322 are set to zero in base page table address register 321.

Although a particular method for deriving an index for selecting a page line is described above, it will be appreciated that many alternatives are possible. In a simple alternative, some number of virtual address bits could be used directly as an index (without the use of XOR 306), these being concatenated with a base address of the page table in memory. The method described above has the advantage of being configurable to different page table sizes, but this feature is not required.

It will also be observed that if low segment portion 305 of virtual address is set to zero, then XOR 323 passes high page portion through unaltered. If high segment portion 303 is also set to zero, and all bits from middle portion 304 which are not masked by mask 322 are also set to zero, then the page table effectively operates as a direct mapped table, i.e., there is a one-to-one correspondence between 64 KB virtual address blocks and page lines 313 of base page table 311. This direct mapping makes patricia tree control blocks (described below) unnecessary, and guarantees that all address translations will require no more than one memory reference. For certain small systems which do not require large virtual address spaces, it may therefore be desirable to operate in this mode. In accordance with the preferred embodiment, the same hardware will effectively operate in this direct mapped mode by simply restricting the range of virtual addresses which are used.

With the indexing address 325 derived as described above, address translation hardware fetches the page line 313 at the corresponding real address. If possible, address translation hardware obtains this page line from L2 or L3 cache (it will be recalled that the 128-byte page line size coincides with the 128-byte cache line size). If necessary, address translation hardware will go all the way to main memory 102 to obtain the page line.

Figure 4:
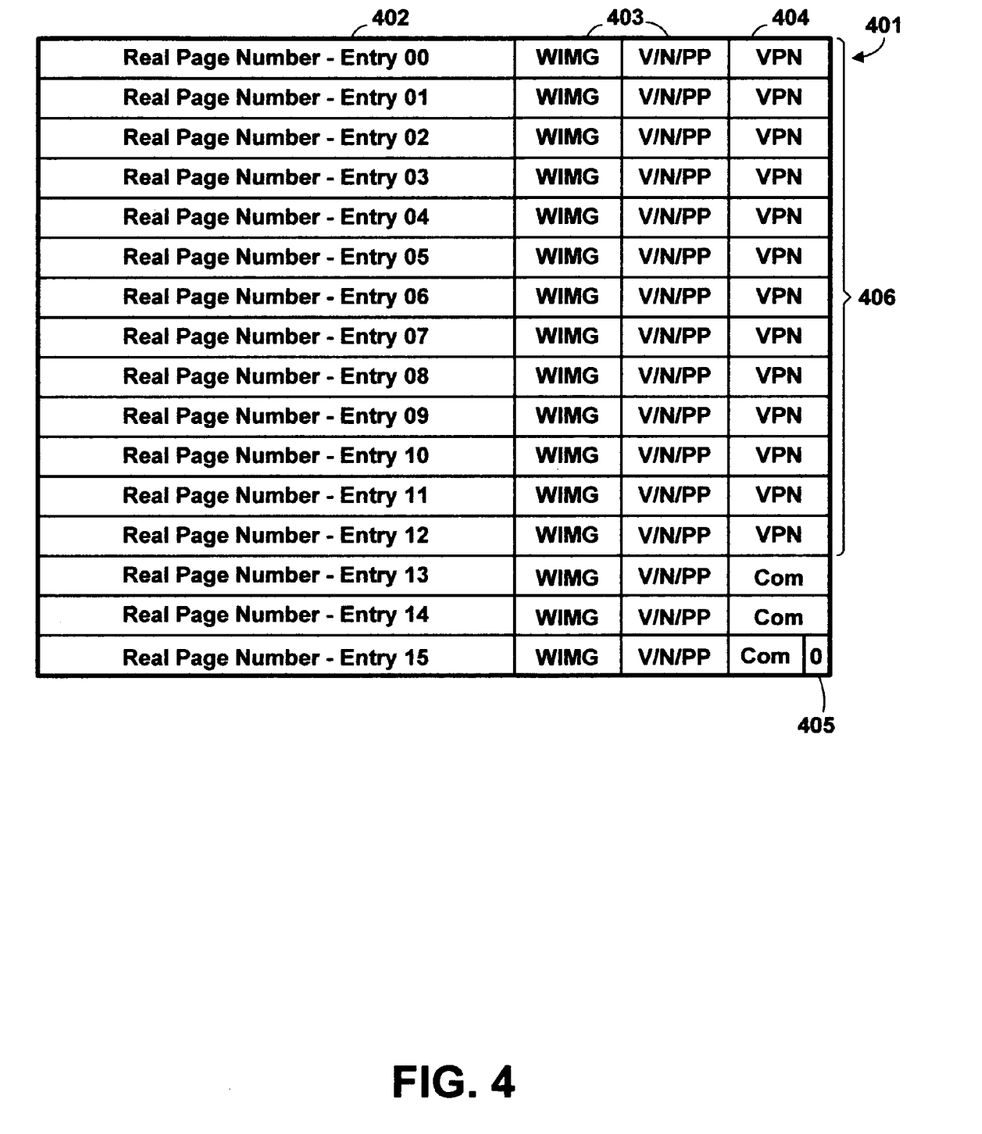
FIG. 4 represents the formatting of a line from a base page table in a first of two formats as an extended page table entry group, according to the preferred embodiment.

The page line thus obtained is decoded by page line decode logic 326. The contents of a page line may assume either one of two formats: an extended page table entry group (EPTEG) format, or a patricia tree control block format, the applicable format being determined by the setting of the final bit (bit 1023) of the page line. An EPTEG is a set of 16 page table entries which have independent real addresses but which occupy a contiguous block of addresses in virtual memory. Because multiple virtual addresses may index to the same page line (by virtue of hashing performed by XOR 323 and the fact that certain high-order bits of virtual address are not used or are masked), there is a possibility of virtual address conflict and a need to accommodate multiple virtual addresses with a single page line. This is accomplished by using a patricia tree control block, as explained in greater detail herein.

Where all of the active virtual addresses (i.e., all the virtual addresses for which real pages currently exist in memory) which index to a particular page line 313 are within the addressing range of a single EPTEG (within a single 64 KB aligned address range), or where there are no active virtual addresses which index to the page line, then the page line will be formatted as an EPTEG. FIG. 4 represents the formatting of a page line as an EPTEG, according to the preferred embodiment.

Referring to FIG. 4, the EPTEG format divides the 128-byte line into sixteen equal sized segments or "entries" 401, each containing 8 bytes (64 bits). Each 8-byte segment or "entry" 401, numbered 0 to 15, corresponds to a virtual address determined by its position in the EPTEG. I.e., entry N corresponds to the virtual address V+N*4096, where V is the common high-order bit portion of a virtual address (above bit 15). Thus, the entries in an EPTEG correspond to successive, contiguous pages (4096 byte blocks) of virtual memory, the full EPTEG translating addresses for a 64 KB block of virtual memory which is aligned on a 64 KB boundary. Each entry 401 contains a 52-bit real page number 402 to which the corresponding virtual address maps, 8 bits of page attribute flags 403 applicable to the corresponding page of real memory (such as write-protected, modified, guarded, invalidated, etc.), and 4 bits of common data 404 which apply to the EPTEG as a whole, and not to any single entry 401. A common high-order portion of the virtual address 406 is distributed among multiple entries in common data 404. I.e, each of entries 0 through 12 contains a respective 4-bit portion of this common high-order portion of virtual address 406, the first 13 entries collectively containing 52 bits of virtual address. The 4-bit common data 404 of the last three entries (entries 13-15) contain data common to the EPTEG block. In particular, the last bit of entry 15 is a format flag 405 indicating whether the line is formatted as an EPTEG or a patricia tree.

Although it is preferred that the common high-order portion of the virtual address be distributed among multiple entries 401 of the EPTEG in order to place real address page numbers on 8-byte boundaries and simplify selection logic, the EPTEG could alternatively be formatted differently. For example, the common high-order portion of virtual address could be placed in some contiguous field at the beginning or end of the EPTEG.

A single EPTEG contains space for 16 real page numbers corresponding to 16 contiguous virtual address pages. However, typically fewer than 16 pages in real memory will actually be allocated from a block of 16 contiguous virtual address pages. Unallocated pages will contain some indication to that effect in the corresponding entry 401. For example, the real page number might be set to some value, such as zero, which is reserved for some special purpose and never requires translation, or some flag or otherwise unused combination of flag bit values from the 8 flags 403 could indicate an unallocated real page.

If the page line 313 is an EPTEG, page line decode logic 326 provides a control signal to that effect so that the page line passes directly to comparator 327 and selector 328. Selector 328 selects one 8-byte entry 401 in the EPTEG corresponding to the value of the 4 bits of low page number 307 from the virtual address, and outputs the corresponding real page number 402 from the selected entry as the translated real page number 309. Selector 327 also outputs sufficient bits from the selected entry to validity logic 329, sufficient for validity logic to determine whether it is a valid allocated real address (according to any applicable convention used to define validity, as explained above). Validity logic 329 produces a one-line valid signal if the selected entry has a valid, allocated real page number.

Figure 5:
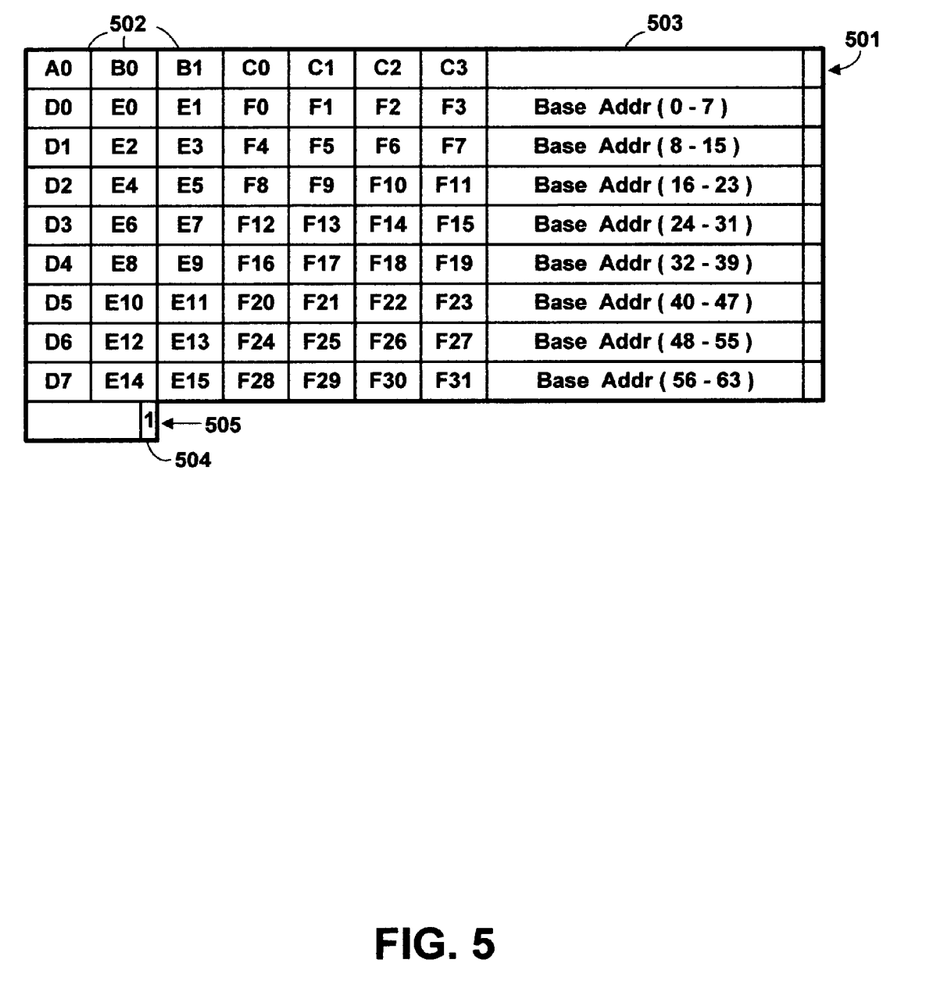
FIG. 5 represents the formatting of a line from a base page table in a second of two formats as a patricia tree control block, according to the preferred embodiment.
Figure 6:
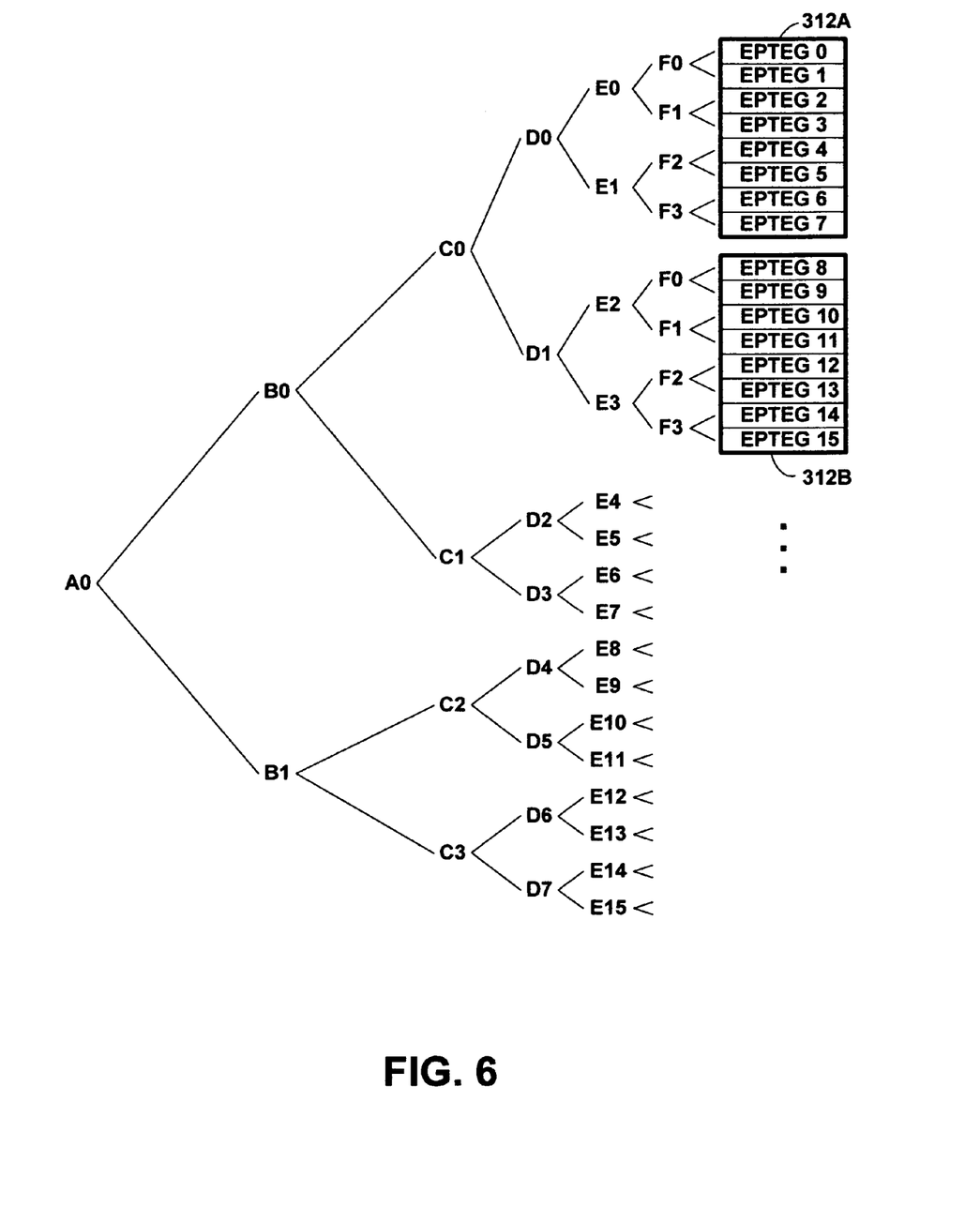
FIG. 6 is a conceptual representation of a patricia tree defined by a patricia tree control block, according to the preferred embodiment.

Comparator 327 compares the high-order 52 bits of virtual address to be translated 301 with a 52-bit virtual address portion 406 produced by concatenating the 4-bit virtual address portions in the common data bits 404 of the first 13 entries in the EPTEG. If these two address portions are identical, a valid signal is output by comparator 327. This valid signal is logically ANDed with the valid signal from validity logic 329 to provide a single valid signal output indicating that the real page number produced by selector 328 is the correct translation of the input virtual address. If this ANDed signal indicates that the output is invalid, then the virtual page is not in real memory, and a page fault is indicated.

Where multiple active virtual addresses in different 64 KB segments having respective allocated real pages map to the same page line 313, then it is necessary to use a different page line format to resolve the address conflict. In the preferred embodiment, the page line is formatted as a patricia tree control block, defining a binary tree to be traversed to locate an applicable EPTEG. FIG. 5 represents the formatting of a page line as a patricia tree control block, according to the preferred embodiment. FIG. 6 is a conceptual representation of a patricia tree defined, by a patricia tree control block, according to the preferred embodiment.

Referring to FIG. 5, the patricia tree control block format divides the contents of the 128-byte page line 313 into nine segments 501 or "3-level trees", each containing 112 bits, a total of 1008 bits. The remaining 16 bits are in a final segment 505. These 16 bits are unused, except for the final bit, which is a format flag 504 used to specify the format (as either an EPTEG or a patricia tree control block, as described above). Each 112-bit segment or "3-level tree" 501 defines a respective 3-level portion of a patricia tree illustrated in FIG. 6. This patricia tree is a binary tree having six levels, designated A through F. The first 112-bit segment corresponds to levels A-C, while each of the remaining 112-bit segments correspond to a respective 3-level sub-tree at levels D-F, having root nodes D0 through D7, respectively. Only subtrees D0 and D1 are shown in FIG. 6 in complete form, the other subtrees being abbreviated for clarity of illustration.

Each segment 501 contains seven 1-byte Next-Bit-to-Test fields (NBTs) 502, a 54-bit base real address 503, and 2 bits of padding to keep segments aligned on byte boundaries. Each 54-bit base real address can specify the beginning address of a respective page table extension block 312. Because a page table extension block is always aligned on a 1024-byte boundary (corresponding to exactly 8 extension block lines 314, each line being 128 bytes in length), it is not necessary to specify more than the 54 high-order real address bits, the 10 low-order bits being zero. A single patricia tree can access up to 8 page table extension blocks, each containing 8 EPTEGs, for a total of 64 EPTEGs. The eight EPTEGs within a page table extension block occupy 8 contiguous extension block lines, the position of each respective EPTEG being determined as a fixed offset from the 54-bit base real address. However, since the patricia tree control block can independently specify the addresses of up to 8 page table extension blocks, there is no requirement that different page table extension blocks be contiguous with one another.

Each NBT 502 corresponds to a respective node of the patricia tree, and defines a path to be taken in the patricia tree when decoding a virtual address. Specifically, each 1-byte NBT contains a 1-bit valid flag and a 7-bit value specifying a bit position of the virtual address to test when traversing the tree. To traverse the tree, the valid flag is examined. If valid, the virtual address bit position specified by the 7-bit value in the NBT is tested, and one of two paths selected based on the value of this bit. If invalid, then there is no allocated EPTEG down the current tree path, indicating that no valid real address can be produced (i.e., a page fault). If the patricia tree is thus traversed all the way down to the F level, the node at F level will specify the position of an extension block line 314 (containing an EPTEG) within the page table extension block at the address specified in the base real address portion 503 of the corresponding segment 501. I.e., the address of the extension block line containing the desired EPTEG is obtained by concatenating the base real address portion 503 of the corresponding segment with three address bits corresponding to the relative position of the path from the F node in the binary tree (there being four F nodes defined by each 3-level segment other than the first, and two paths from each F node, for a total of eight paths) and with seven binary zeroes (corresponding to the 128-byte size of an extension block line). In the preferred embodiment, the real address portion 503 of the first 3-level entry, corresponding to nodes at tree levels A-C, is not used, although it would alternatively be possible to use this address portion by truncating the patricia tree to three levels in situations where no more than eight EPTEGs are required to be accessed.

A simple example of this traversal follows. For a given virtual address to be decoded to an EPTEG entry (assuming all validity bits are set to valid), the value of the virtual address bit at the position corresponding to the 7-bit value in NBT A0 is 0, indicating a path to node B0; the value of the virtual address bit corresponding to the value in NBT B0 is 0, indicating a path to node C0; the value of the virtual address bit corresponding to the value in NBT C0 is 1, indicating a path to node D1; the value of the virtual address bit corresponding to the value in NBT D1 is 0, indicating a path to node E2; the value of the virtual address bit corresponding to the value in NBT E2 is 1, indicating a path to node F5; and the value of the virtual address bit corresponding to the value in NBT F5 is 1, indicating the extension block line containing EPTEG11. The real address of the desired EPTEG (EPTEG11) is the 54-bit high order portion specified in the base address portion 503 of the 3-level segment 501 for nodes D1-E3-F5 (i.e., the third 3-level segment), concatenated with binary '011' (corresponding to the position of EPTEG11 within its extension block), concatenated with binary '0000000'.

The traversal of the binary tree defined by the patricia tree control block is described above as a series of sequential operations for clarity of understanding. It will be understood by those of skill in the art that page line decode logic 326 can implement the tree traversal in fast logic which tests various conditions concurrently rather than sequentially. This logic ultimately produces an address corresponding to an extension line 314 (i.e., an EPTEG) within a page table extension block 312. If the address is valid (all the validity bits encountered by the logic in traversing the tree are set to valid), the EPTEG at this address is fetched from cache or main memory. The EPTEG thus fetched is decoded using comparator 327, selector 328, and validity logic 309, in the manner described above. Thus, if the page line is formatted as an EPTEG, a single memory access is required to translate a virtual address to its corresponding real address. If the page line is formatted as a patricia tree control block, two memory accesses (the first to obtain the patricia tree control block, the second to obtain the EPTEG from the address of the decoded patricia tree control block) are required. In no case are more than two memory accesses required when using the page table mechanism of the preferred embodiment. Furthermore, because each EPTEG contains 16 page table entries from contiguous memory locations, and each patricia tree control block references multiple EPTEGs, it is highly likely that any required EPTEGs or patricia tree control blocks will already be in cache.

Because the page table extension blocks 312 have independent real addresses, they can be allocated independently as the need arises. A full page table extension block 312 of 8 extension block lines 314 must be allocated, but it is not necessary to allocate all 8 page table extension blocks potentially indexed by the patricia tree control block. Furthermore, although 8 block lines, each containing one EPTEG, must be allocated, it is not necessary to allocate any particular number of real pages within a given extension block. Some of the EPTEGs within an allocated page table extension block might contain no valid entries, and some of the EPTEGs might contain some entries which are valid and some entries which are invalid.

Typically, far fewer than 64 EPTEGs will be needed for any given patricia tree control block at any one time. Although it is considered a rare event, it is theoretically possible for the page table mechanism to require more than 64 EPTEGs corresponding to a single index address. In the preferred embodiment, the patricia tree is limited to 6 levels and 64 EPTEGs for simplicity. In the unlikely event that the paging mechanism brings in a new page requiring a 65$^{th}$ EPTEG to support virtual address translation, an existing EPTEG is de-allocated (and any real pages it references would become unusable). It would alternatively be possible to cascade multiple patricia tree control blocks to support any required number of EPTEGs, i.e., the leaf node of a patricia tree control block could reference either an EPTEG or another patricia tree control block.

The operation of paging function 215 has not been described in detail, but in general it will be understood that paging function 215 maintains page table 210 according to the structure and constraints herein described. In particular, paging function maintains patricia tree control blocks by adding and removing nodes from the trees thus defined, and allocating or de-allocating patricia tree control blocks as required. Normally, where a new EPTEG is required to be accessed by a patricia tree, a leaf is added to an existing leaf of the tree, where possible. Where this is not possible (because the node to which it would be added is already at the F level), the paging function can reconstruct the tree using different bit selections in one or more NBT fields to better distribute nodes of the patricia tree, and thus enable support of the additional EPTEG. In the rare case where it is not possible to add a leaf because the tree is completely filled, an existing EPTEG can be selected for deallocation. The paging function is software which is relatively slow in comparison to the address translation hardware 205. Address translation hardware should be fast because address translation occurs with far greater frequency than page faults.

As described above, address translation mechanism translates a virtual address generated by the processor to a real address for accessing memory. Additional levels of addressing may exist in computer system 100, which are not described herein and are not essential to an understanding of the present invention. Such additional levels may include multiple types of virtual address, i.e., addresses having no fixed correspondence to real memory locations, and/or multiple levels of real address having a fixed correspondence to real memory locations. For example, as is known in some systems, first type of virtual address in the address space of a processor's instruction and execution units might be translated to a second type of virtual address in a larger universal space of multiple processes by translating a high-order address segment of the first address to a larger high-order address segment of the second type. As another example, a first type of real address in a real address space of a multi-node or NUMA system might be translated to a second type of real address in the local real address space of a single node. The present invention may be used with addressing architectures having only a single type of virtual address and a single type of real address, as well as those having multiple types of virtual and/or real addresses.

In the preferred embodiment described herein, a page line can be formatted either as an EPTEG or a patricia tree control block for accessing multiple EPTEGs. However, it would alternatively be possible to format the page line in every case as a patricia tree control block, which is traversed to select an EPTEG. Such a formatting may simplify the page line decode logic, at the cost of requiring an additional memory access to translate some virtual addresses which might have been translated directly from an EPTEG in the page line. If the number of page lines in relation to the virtual address space is sufficiently small so that most or all of the page lines will contain patricia tree control blocks anyway, this alternative may be useful.

In the preferred embodiment described herein, a patricia tree is used because multiple different virtual address blocks of 64 KB can map to the same page line, creating the possibility of a conflict. However, the use of a patricia tree control block or similar structure defining a binary tree is only one possible aspect of the preferred embodiment, representing one possible technique for handling an overload of virtual addresses. There are alternative techniques for dealing with this possibility. For example, an index derived from a virtual address might access a fixed-size associativity set of multiple EPTEGs, each of which is then compared with the virtual address to be translated in order to determine whether any of them corresponds to the address. Other alternative mechanisms could be used in situations of virtual address conflict.

It will be further understood that the use of blocks of page table entries, called EPTEGs, each entry of which corresponds to a contiguous page of the virtual address space, also represents only one aspect of the preferred embodiment, and that a binary tree structure for selecting a page table entry could be used without the EPTEG structure. For example, each leaf of the patricia tree could access a single, independent page line entry which translates a single virtual address page to a corresponding real address page. Alternatively, each leaf of the patricia tree could access a group of page line entries which are not restricted to contiguous virtual memory pages.

In the preferred embodiment described herein, various numerical parameters are given. For example, virtual addresses have a length of 80 bits, real addresses have a length of 64 bits, pages have a minimum size of 4096 bytes, cache lines are 128 bytes in length, and so forth. While these numbers are believed to be typical design parameters for a large computer system using current technology, it will be understood that these numerical parameters are stated in order to describe a particular embodiment, and that the present invention is not limited to any particular size of virtual address, real address, page, cache line, or other numerical parameter.

Although a specific embodiment of the invention has been disclosed along with certain alternatives, it will be recognized by those skilled in the art that additional variations in form and detail may be made within the scope of the following claims:

What is claimed is:

1. An address translation mechanism for translating a virtual address in a virtual address space to a real address for accessing memory of a digital data processing system, comprising: a block accessing mechanism which uses a first portion of a virtual address to be translated to select at least one block from among a plurality of equal-sized blocks, each said block containing a respective plurality of page table entries; wherein each said page table entry within each said block corresponds to a respective page of said virtual address space, wherein all said pages of virtual address space corresponding to page table entries in the same said block are contiguous, all said pages of virtual address space corresponding to page table entries in the same said block sharing a common high-order portion of a virtual address corresponding to the respective block; a selector for selecting a page table entry from among said plurality of page table entries within a said block selected by said block accessing mechanism, said selector using a second portion of said virtual address to be translated, said second portion and said first portion being disjoint; and a comparator for comparing a third portion of said virtual address to be translated with at least part of said common high-order portion of a virtual address corresponding to a said block selected by said block accessing mechanism and generating a signal indicating whether said third portion of said virtual address to be translated and said portion of a virtual address corresponding to the block selected by said block accessing mechanism are identical,
   wherein said block accessing mechanism comprises: an indexing mechanism which derives an indexing address from said first portion of said virtual address to be translated, said indexing address being a real address of a page line of a base page table, said base page table having a pre-determined number of said page lines of equal size,
   wherein at least some of said page lines comprise respective binary tree definitional structures; and wherein said address translation mechanism further comprises decode logic which traverses a binary tree defined by said binary tree definitional structure by testing selective bits of said virtual address to be translated to reach a leaf of said binary tree, said leaf defining a location of a said block.

2. The address translation mechanism of claim 1, wherein each of a plurality of different said page table entries within each respective said block contains a respective portion of said common high-order portion of said virtual address corresponding to the respective block.

3. The address translation mechanism of claim 1, wherein said pre-determined number of said page lines of equal size is configurable.

4. The address translation mechanism of claim 1, wherein at least some of said page lines comprise respective said blocks.

5. The address translation mechanism of claim 1, wherein said block accessing mechanism includes a hashing function for transforming an N-bit portion of said virtual address into an M-bit portion of an index for selecting said at least one block.

6. The address translation mechanism of claim 5, wherein said hashing function comprises a bit-wise exclusive-OR operation between a fourth portion of said virtual address and a fifth portion of said virtual address, said fourth and fifth portions being included within said first portion of said virtual address.

7. An address translation mechanism for translating a virtual address in a virtual address space to a real address for accessing memory of a digital data processing system, comprising:
   an accessing mechanism which uses a first portion of a virtual address to be translated to select a binary tree definitional structure from among a plurality of binary tree definitional structures, each said binary tree definitional structure defining a respective binary tree containing a plurality of nodes;
   decode logic which decodes a binary tree definitional structure selected by said accessing mechanism, said decode logic traversing a binary tree defined by the binary tree definitional structure to a leaf node by testing selective bits of said virtual address to be translated to determine a path to be followed from each node of said binary tree;
   wherein said leaf node defines a set of at least one page table entry, said at least one page table entry defining a portion of a real address and a corresponding portion of a virtual address; and
   a comparator for comparing a second portion of said virtual address to be translated with said portion of a virtual address defined by said page table entry and generating a signal indicating whether said second portion of said virtual address to be translated and said portion of a virtual address defined by said page table entry are identical.

8. The address translation mechanism of claim 7, wherein said binary tree definitional structure includes a plurality of next-bit-to-test fields, each said next-bit-to-test field corresponding to a respective node of the binary tree defined by said binary tree definitional structure, each next-bit-to-test field comprising a value specifying a bit position of said virtual address to be translated which is to be tested by said decode logic to determine a path to be followed from the corresponding node.

9. The address translation mechanism of claim 7, wherein said binary tree definitional structure includes a plurality of real address fields, each said real address field containing a portion of a real address corresponding to a respective set of at least one said leaf node, each said real address field specifying a portion of a real address occupied by said set of at least one page table entry defined by the at least one leaf node.

10. The address translation mechanism of claim 9, wherein each said real address field contains a portion of a real address corresponding to a respective set of a plurality of said leaf nodes, each said real address field specifying a common portion of a real address occupied by a set of a plurality of said page table entries, each respective leaf node corresponding to a respective discrete subset of said set of a plurality of said page table entries, said discrete subset occupying a real address range determined by concatenating said common portion of a real address with at least one address bit corresponding to a relative position of a path from the respective leaf node in said binary tree.

11. The address translation mechanism of claim 7,
   wherein said leaf node defines a set of a plurality of said page table entries; and
   wherein said address translation mechanism further comprises a selector for selecting one of said plurality of page table entries defined by said leaf node using a third portion of said virtual address to be translated, said third portion and said first portion being disjoint.

12. The address translation mechanism of claim 7, wherein said block accessing mechanism includes a hashing function for transforming an N-bit portion of said virtual address into an M-bit portion of an index for selecting said binary tree definitional structure.

13. A computer system, comprising: a memory addressable using real addresses in a real address space; at least one processor executing instructions resident in said memory, said processor generating memory references, said memory references using virtual addresses in a virtual address space; a paging mechanism for maintaining a page table data structure in said memory, said page table data structure comprising a plurality of equal-sized blocks, each said block containing a respective plurality of page table entries, each said page table entry corresponding to a respective page of said virtual address space, wherein all said pages of virtual address space corresponding to page table entries in the same said block are contiguous, all said pages of virtual address space corresponding to page table entries in the same said block sharing a common high-order portion of a virtual address corresponding to the respective block; an address translation mechanism for translating said virtual addresses generated by said at least one processor to real addresses, said address translation mechanism comprising: (a) a block accessing mechanism which uses a first portion of a virtual address to be translated to select at least one said block of said page table; (b) a selector for selecting a page table entry from among said plurality of page table entries within a said block selected by said block accessing mechanism, said selector using a second portion of said virtual address to be translated, said second portion and said first portion being disjoint; and (c) a comparator for comparing a third portion of said virtual address to be translated with at least part of said common high-order portion of a virtual address corresponding to a said block selected by said block accessing mechanism and generating a signal indicating whether said third portion of said virtual address to be translated and said portion of a virtual address corresponding to the block selected by said block accessing mechanism are identical, wherein said page table data structure comprises a base page table having a pre-determined number of page lines of equal size and a plurality of extension blocks, at least some of said page lines comprising respective binary tree definitional structures; wherein said block accessing mechanism comprises an indexing mechanism which derives an indexing address from said first portion of said virtual address to be translated, said indexing address being a real address of a page line of said base page table; and wherein said address translation mechanism further comprises decode logic which traverses a binary tree defined by said binary tree definitional structure by testing selective bits of said virtual address to be translated to reach a leaf of said binary tree, said leaf defining a location of a said extension block.

14. The computer system of 13, wherein said address translation mechanism further comprises at least one translation look-aside buffer, said address translation mechanism translating a said virtual address to a said address by looking for a corresponding entry in said translation look-aside buffer, and if no such corresponding entry can be found, then by using said block accessing mechanism, said comparator and said selector.

15. The computer system of claim 13, further comprising at least one cache for temporarily storing portions of said memory, said equal-sized blocks being storable in said at least one cache.

16. The computer system of claim 13, wherein said computer system comprises a plurality of said processors and a plurality of said address translation mechanisms, each processor being associated with a respective address translation mechanism.

17. The computer system of claim 13, wherein each of a plurality of different said page table entries within each respective block contains a respective portion of said common high-order portion of said virtual address corresponding to the respective block.

* * * * *